United States Patent Office 2,823,507
Patented Feb. 18, 1958

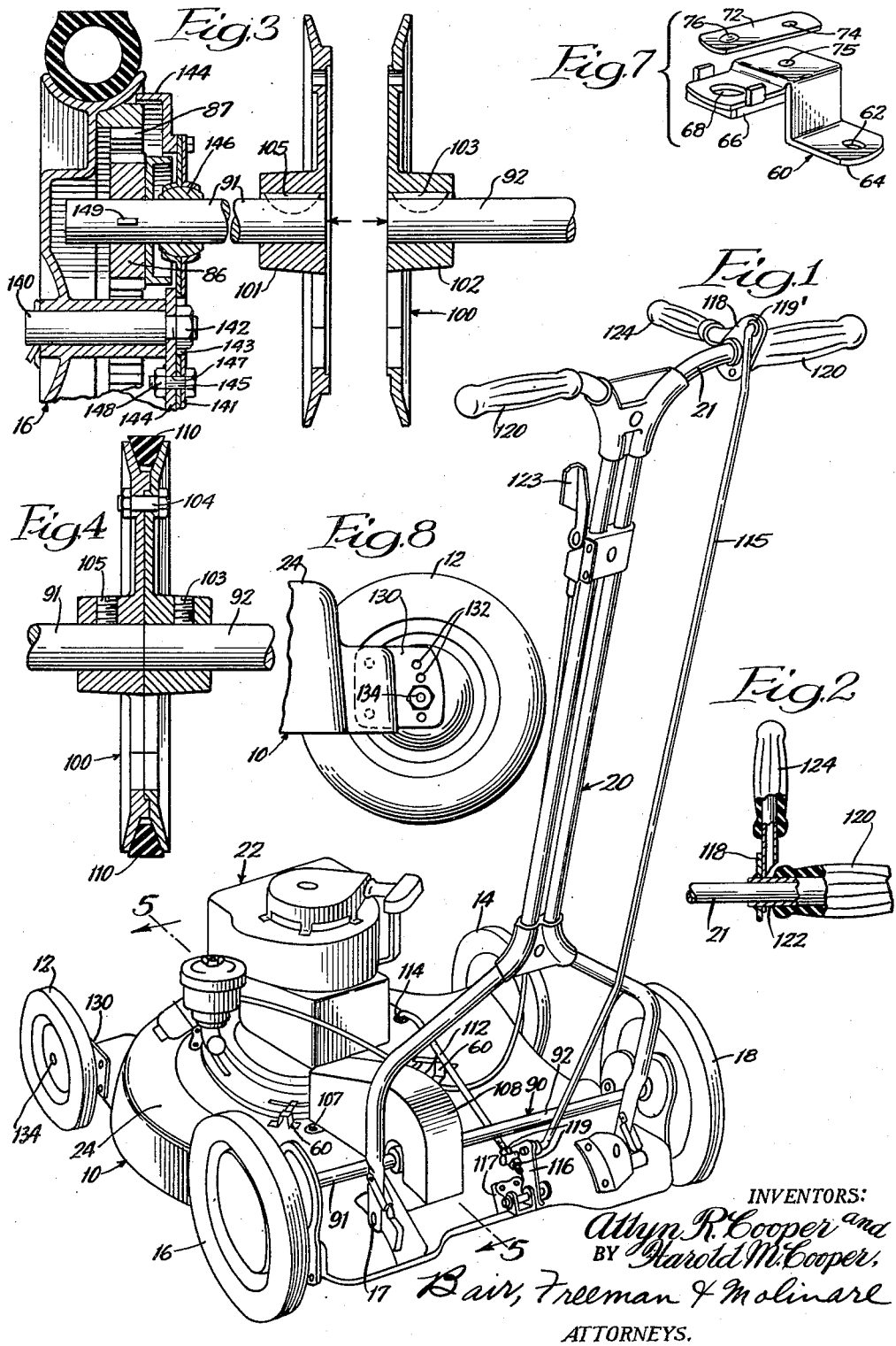

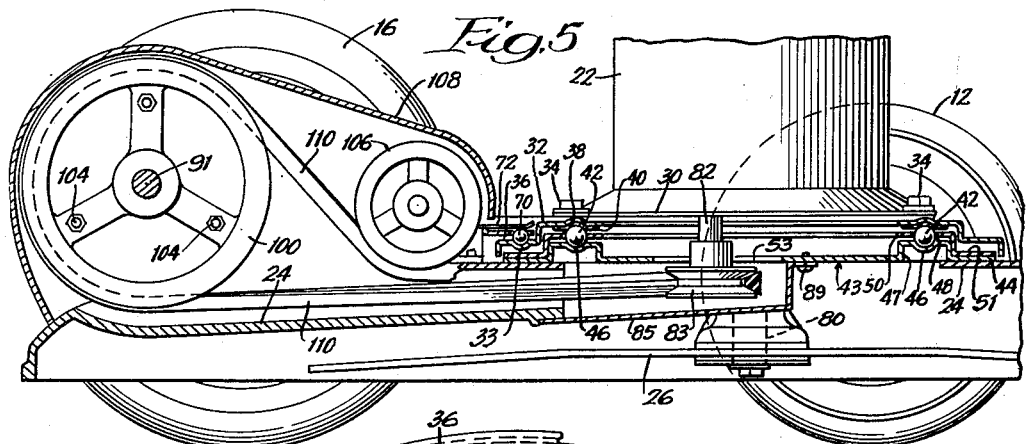
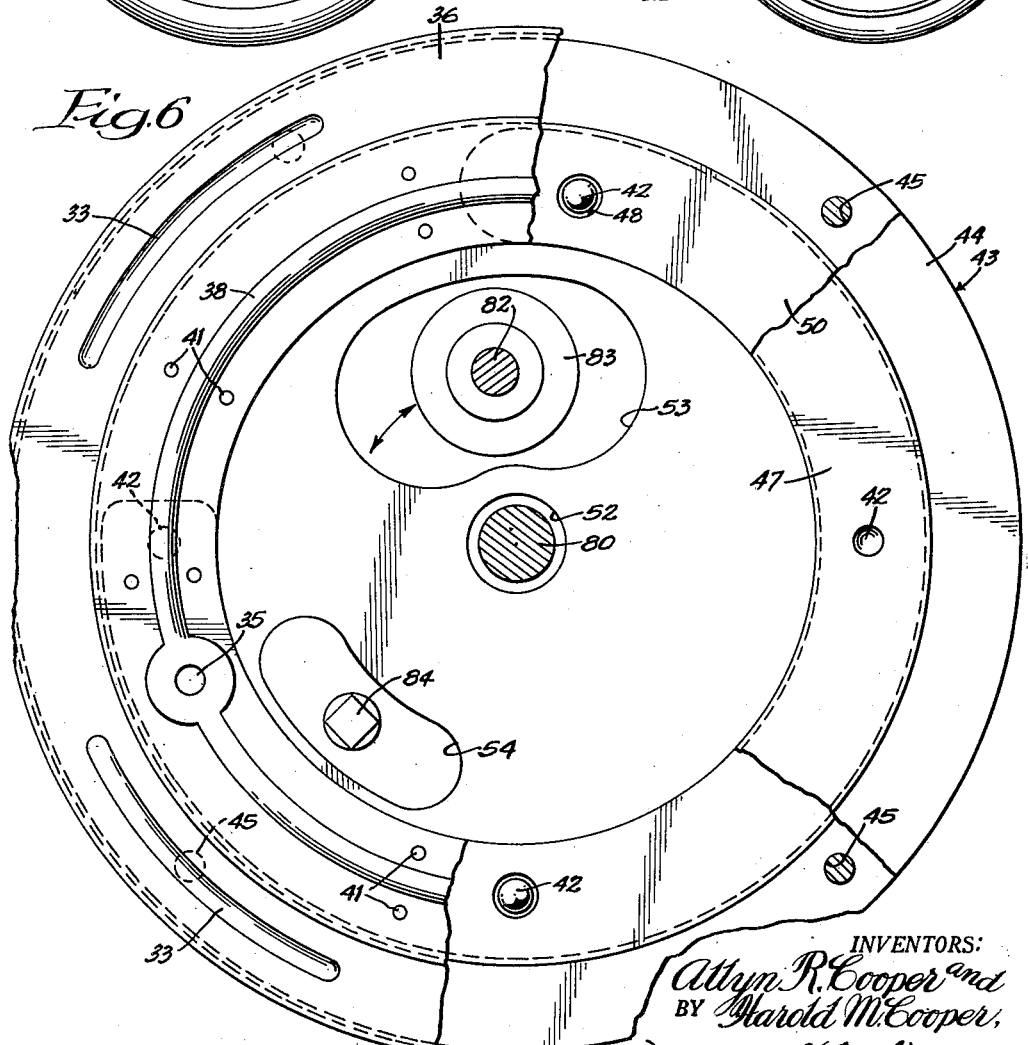

2,823,507

POWER ROTARY LAWN MOWER

Allyn R. Cooper and Harold M. Cooper, Marshalltown, Iowa

Application February 6, 1956, Serial No. 563,514

13 Claims. (Cl. 56—25.4)

This invention relates to a rotary-type power lawn mower and more particularly to a mower of this kind which is self-propelled.

One object of the invention is to provide an improved means for transmitting the driving force from the engine to the ground wheels.

Another object is to provide an improved clutch mechanism whereby instantaneous engagement and disengagement of the power to the driving wheels is obtained with little effort on the part of the operator.

Another object is the provision of a simplified belt drive which may be readily disassembled to replace the belt without removing the engine or any other difficultly-removable parts of the mower.

According to one feature of the invention the engine is rotatably mounted on the deck of the cutting blade housing and has a central crankshaft and a cam shaft, radially spaced from the crankshaft, both shafts extending below the deck. The cam shaft carries a driving pulley for driving the wheels by means of a belt while the crankshaft carries the cutting blade. By oscillating the engine about the axis of the crankshaft, the cam shaft travels through a small arc to tighten or loosen the belt to engage or disengage the wheels with the driving pulley on the cam shaft.

Another object of the invention is to provide a rotary clutch actuating sleeve conveniently mounted on the handle of the mower which facilitates operation of the novel clutch mechanism.

These and other objects will become apparent from the following description when read in conjunction with the accompanying drawings, wherein:

Figure 1 is a perspective view of a rotary mower constructed in accordance with the invention;

Figure 2 is a fragmentary view of the right grip of the mower handle, partially broken away to show the construction thereof;

Figure 3 is a fragmentary central longitudinal sectional view through the driven pulley and one of the driving wheels taken along the driving shaft which extends across the mower between the wheels. The pulley and the driving shaft are shown in disassembled position;

Figure 4 shows the driven pulley of Figure 3 in assembled position;

Figure 5 is a sectional view taken along the line 5—5 of Figure 1;

Figure 6 is an enlarged plan view of the engine mounting means, broken away to show the individual elements comprising said mounting means;

Figure 7 is a perspective exploded view of a ball retainer and engine hold-down bracket; and Figure 8 is an elevational view of a wheel showing the adjustable mounting means for securing it to the mower housing.

The mower generally comprises a housing 10 which encloses the blade and supports the engine which powers the unit. The housing has a lateral discharge opening (not shown) for the grass clippings at the forward end through which the clippings are discharged by the centrifugal force and air currents resulting from high speed rotation of the cutting blade. The housing is supported by front ground wheels 12 and 14, wheel 14 being mounted just behind the grass discharge opening, and rear wheels 16 and 18, which serve to propel the mower as hereinafter set forth. A handle 20 of the conventional dual tubular type used for guiding lawn mowers projects upwardly from the rear of the housing to which it is pivotally connected, as indicated at 17. A suitable gasoline engine, designated generally by the numeral 22, is provided to supply the power for rotating the grass cutting blade 26 (Figure 5) and for propelling the rear driving wheels of the mower. The engine is mounted on the deck 24 of the housing 10.

To facilitate oscillating the engine to move the eccentrically-disposed cam shaft for clutching the driving wheels, we have provided a mounting structure, which is best shown in Figures 5 and 6. The flanged base 30 of the engine is bolted to a mounting ring 32 by means of a plurality of circumferentially spaced bolts 34 extending through openings 35 in the ring. The ring 32 has an offset marginal flange 36 which cooperates with hold-down brackets to secure the engine to the deck, as explained in more detail below. Just inside the marginal flange 36 is a circumferentially-extending inverted depression or groove 38 which constitutes a race for ball bearings 42 on which the weight of the engine bears. The depression 38 is lined with bearing metal 40 secured to the ring 32 by means of rivets 41, shown in Figure 6. Thus, the ring 32 turns freely on the ball bearings 42. The bearings are supported by circumferential elevated ridge 47 formed in base plate 43 which is rigidly secured to the deck 24 through the outwardly-extending marginal flange 44. The elevated ridge 47 is provided with four arcuate depressions or dimples 46 in which balls 42 are seated. Obviously, the number of ball bearings may be increased or decreased in accordance with the weight of the particular engine employed. To prevent the ball bearings from becoming dislodged from depressions 46, we have provided a retainer ring 50 having a downwardly and outwardly extending flange 51 which is adapted to overlie the flange 44 of base plate 43. Both flanges 44 and 51 are secured to the deck 24 by means of common rivets, bolts or the like, which extend through openings 45. Ring 50 has an opening 48 therethrough for each ball bearing, the openings being aligned with the depressions 46.

To prevent the ring 32 and the engine secured thereto from lifting off the deck, as when the mower is moving over rough terrain, we have provided a hold-down bracket 60 of inverted channel shape, best illustrated in Figure 7. Any number of these hold-down brackets may be employed at spaced points about the ring 32. In the construction shown, we have used four brackets equally-spaced about the circumference of the ring. Each bracket 60 has a pair of feet 64, projecting from the vertical side members, which are used to anchor the bracket to the deck 24 by means of bolts which extend through the openings 62 in the feet and through a complementary opening in the deck 24. Each bracket has an inwardly-extending arm 66 having a ball-bearing retainer opening 68 extending therethrough. The arm extends over the flange 36 of the ring 32 with the opening 68 aligned with the groove 33 therein. The opening 68 serves as a retainer for ball bearing 70 which is adapted to roll in groove or race 33, formed in the flange 36. A resilient leaf or finger 72 is secured to the top of the bracket 60 by means of a rivet or bolt adapted to extend through the openings 74 and 75 in the finger and bracket, respectively. A depression or dimple 76 in the leaf is adapted to bear on the top of the ball 70 which projects upwardly through the opening 68. The leaf may be made of spring steel or other suitable resilient material so that some vertical movement of the ring 32 is permitted. The hold-down force thus brought to bear on the flange 36 resiliently secures the engine to the deck without interfering with the rotation of the engine on the ball bearings 42. Resilient hold-down means also compensates for wear due to rotation of the engine. Obviously, other suitable resilient hold-down means may be provided in place of the bracket assembly described.

The plate 43 constitutes the lowermost element of the mounting assembly and has a central opening 52 (Figure 6) to accommodate the engine crankshaft 80 extending downwardly through the deck from the engine. Similar suitable openings are provided through the plate 43 to accommodate other projections. The arcuate opening 53, radially spaced from the central opening 52, permits the eccentric cam shaft 82 and the pulley 83 mounted thereon to oscillate through an angle of 10° or so as the engine is rotated about the axis of crankshaft 80. A similar arcuate opening 54 is provided to accommodate movement of the projecting oil drain plug 84. A suitable cover (not shown) may be provided to enclose the plug 84. A sealing cover 85 is provided to enclose the pulley 83 and the pulley belt 110. This cover is secured to the underside of the plate 43 by means of a screw 89. The opening 52 is rather close fitting so that the plate 43 serves to seal off the engine from dirt, dust and grass clippings prevalent within the housing. The speed of the cutting blade 26, secured to the end of the crankshaft 80, sets up air currents which cause more or less of a vacuum near the center and, consequently, clippings and dirt are thrown outwardly so that they do not get through the space between opening 52 and shaft 80. It will be noted that the pulley 83, connected to the end of the cam shaft 82, is located vertically between the underside of the plate 43 and the cutting blades 26. The blade is low enough so that it amply clears the cover 85 and the rearwardly sloping portion of the deck 24.

The V-belt 110, trained about the driven pulley 83, is adapted to drive the rear wheels 16, 18 through a pulley 100 secured to the driving shaft 90 extending across the housing at the rear of the machine between the rear wheels. The wheels 16 and 18 are mounted on stub axles 140 (Figure 3) connected to wheel gear cover plate 144 by means of a nut 142. Cover plate 144 is secured to the main double support plate 141 which in turn is fixed to the housing 10 by means not shown. Support plate 141 has an arcuate slot 143 therethrough to permit the nut 142 to move for purposes of adjusting the height of the mower above the ground, as explained below. The upper portion of the support plate 141 supports self-aligning bearing 146 for drive shaft 91. The wheel cover plate 144 is locked against rotation by the bolt 145 which slides through one of a series of spaced holes 147 and screws into nut 148 welded to plate 144. By removing the bolt 145 and rotating the cover plate 144 about shaft 91 so that nut 148 is opposite a different hole located on an arc above or below hole 147, the height of the mower may be regulated. Both rear wheels may be set at exactly the same height by using duplicate holes 147.

The wheels are preferably of the sealed construction described in detail in our earlier Patent No. 2,639,929, and are driven by a pinion 86 which meshes with the internal gear teeth 87 disposed on the inner circumference of the wheel. The pinions 86 are driven by a shaft 90 which is divided into two lengths—91 and 92—which abut within the shaft opening through driven pulley 100. A pawl 149 extending through the shaft causes the pinion to drive the wheel in the forward direction only. The pulley or sheave 100 is adapted to split perpendicular to its axis into two parts—101 and 102—to permit removal and replacement of the belt 110. The two halves of the pulley are held together by means of several circumferentially-spaced bolts 104 so that the pulley may be readily assembled or disassembled. The assembled pulley is illustrated in Figure 4. The pulley half designated by the numeral 102 is fixed to the length 92 of shaft 90 by means of a spring drive pin or other similar keying device 103. Likewise, the pulley half 101 is fixed to length 91 by key 105. When the bolts 104 are removed to permit disassembling the pulley into its component parts, one length of the shaft 90 must necessarily move axially to permit removal of the belt. In the drawing, the shaft 91 serves this purpose and is adapted to slide laterally through the bearing 146 by removing the wheel assembly 16 from the supporting plate 141. When the wheel is removed only the pinion 86 on shaft 91 remains on the mower.

To transmit power from the engine cam shaft 82 to the driving wheels, a V-belt 110 is trained over the driving pulley 83, under an idler pulley 106 which is rotatably mounted on a shaft secured to the deck 24 of the housing, and around the pulley 100 fixed to the shaft 90. The pulleys 100 and 106 are enclosed in a suitable housing 108 to prevent objects from becoming caught in the belt or the pulleys. The housing 108 is fixed to the deck by means of screws 107, as shown in Figure 1.

To oscillate the engine about its crankshaft as an axis in order to loosen or tighten the belt 110 for clutching purposes, we have provided a substantially horizontal rod 112 which, at one end, is pivotally connected to the base of the engine, as indicated at 114. Preferably, the rod 112 connects to the base of the engine at a point diametrically opposite the cam shaft. The other rearward end of the rod 112 connects to a bell crank 116, the lower end of which is pivotally secured to the deck by means of a bracket 117. The length of rod 112 may be adjusted to compensate for variations in the length of belt 110 by the two lock nuts 119. The bell crank 116 also connects to a link 118 mounted on the handle by means of a substantially vertical rod 115. As best shown in Figure 2, the right handle grip 120 consists of a rubber grip enclosing a metal sleeve 122 rotatably mounted on the tubular rod 21 comprising the right half of the handle 20. The link 118 is welded to the sleeve 122, perpendicular thereto. The upper end of rod 115 is pivotally connected to the link as indicated at 119'. A second vertical grip or lever 124 is welded or otherwise rigidly secured to the sleeve 122 to provide an alternative means for actuating the clutch. The clutch may be actuated with little effort by oscillating the grip 120 within the hand, or by flipping the lever 124 as desired.

The operation of the device will be readily understood from the foregoing description. Crankshaft 80 and the cam shaft 82 rotate when the engine is running and these shafts, in turn, rotate the cutting blade 26 and the pulley 83, respectively. To cause the driving wheels to move and propel the mower forwardly, the grip 120 is rotated forwardly to the position shown in Figure 1. This causes the rod 115 to move upwardly, and rod 112 to move rearwardly and rotate the engine in a clockwise direction about crankshaft 80 has a center through an arc of approximately 5°. The cam shaft 82, which is part of the engine and eccentric with respect to the crankshaft, moves forwardly (being diametrically opposite the point 114 where rod 112 connects to the engine mount) and tightens the belt 110, thus causing driving force to be transmitted from the pulley 83 to the pulley 100 fixed to the shaft 90. The speed of the engine is controlled by throttle 123 mounted on the handle. By flipping the lever 124 upwardly, the belt 110 is loosened so that it transmits no force to the pulley 100, and motion of the mower is stopped.

The front wheels of the mower may be adjustably mounted on the housing to permit increasing or decreasing the distance between the housing and the ground to match the settling of the rear wheels, thereby regulating the height of the cutting blade and the closeness of cut. Vertical adjustment means of this type is shown in Figure 8. A plate 130 having a plurality of shaft-receiving openings 132 is rigidly fixed to the skirt of the housing. The openings are vertically spaced to provide height adjustment by fastening the stub shaft 134 of the wheel to the desired opening. Each front wheel is equipped with a similar plate so that the housing may be elevated to the same height all around merely by mounting each wheel in the proper opening in its plate.

Modifications of our mower construction will occur to those skilled in the art without departing from the spirit of the invention. It is, therefore, our intention not to limit the invention other than as necessitated by the scope of the appended claims.

What we claim as new and desire to secure by Letters Patent of the United States is:

1. A rotary power mower comprising a housing, a plurality of ground wheels fixed to said housing for supporting said housing, an engine mounted on said housing for rotation about a vertical axis through the crankshaft of said engine, a cutting blade fixed to the end of said crankshaft and disposed within the housing, said engine having a cam shaft radially spaced from said crankshaft and carrying a pulley, a belt trained about said pulley and adapted to transmit driving power to at least one of said wheels, and actuating means connected to said engine for oscillating said engine about said crankshaft axis to effect movement of said pulley, whereby said belt may be tightened or loosened to clutch the pulley with the wheels.

2. A rotary power mower comprising a housing having a horizontal deck, a pair of ground wheels for supporting said housing, a drive shaft for said wheels extending across the housing and connecting to said wheels, a driven pulley fixed to said drive shaft intermediate the wheels for driving said wheels through said drive shaft, an engine mounted on said deck for rotation about a vertical axis through the crankshaft of said engine, a cutting blade fixed to the end of said crankshaft and disposed within the housing, said engine having a cam shaft radially spaced from said crankshaft and carrying a driving pulley, a belt trained over said driving and driven pulleys to transmit driving force to said wheels, and actuating means connecting to said engine for oscillating said engine about said crankshaft axis to effect movement of said driving pulley, whereby said belt may be tightened or loosened to clutch the pulley with the wheels.

3. The mower of claim 2 wherein said drive shaft is divided at said driven pulley into two lengths and said driven pulley is adapted to split at right angles to its axis into two parts, at least one of said parts being secured to one of the adjacent opposed ends of said two lengths, and one of said lengths being adapted to move axially through the wheel associated therewith thus permitting separation of said pulley parts to remove said belt.

4. The mower of claim 2 wherein said engine is mounted on roller bearings and held to said deck by resilient fingers.

5. A rotary power mower comprising a housing having a horizontal deck, a plurality of ground wheels attached to said housing for supporting said housing, a handle extending upwardly from said housing for guiding said mower, an engine mounted on said deck for rotation about a vertical axis through the crankshaft of said engine, a cutting blade fixed to the end of said crankshaft and disposed within the housing, said engine having a cam shaft radially spaced from said crankshaft and carrying a pulley, a belt trained about said pulley and adapted to transmit driving power to at least one of said wheels, and an actuating rod mounted on said handle and connecting through a linkage to said engine for oscillating said engine about said crankshaft axis to effect movement of said pulley, whereby said belt may be tightened or loosened to clutch the pulley with the wheels.

6. A rotary power mower comprising a housing having a horizontal deck, a plurality of ground wheels attached to said housing for supporting said housing, an engine mounted on said deck for rotation about a vertical axis through the crankshaft of said engine, a cutting blade fixed to the end of said crankshaft and disposed within the housing, said engine having a cam shaft radially spaced from said crankshaft and having its lower end terminating below said deck and above the path of said blade, a pulley fixed to said lower end, a belt trained about said pulley and adapted to transmit driving power to at least one of said wheels, and actuating means connected to said engine for oscillating said engine about said crankshaft axis to effect movement of said pulley, whereby said belt may be tightened or loosened to clutch the pulley with the wheels.

7. A rotary power mower comprising a housing having a horizontal deck, a pair of ground wheels mounted on said housing for supporting said housing, a drive shaft extending across the housing and connecting to said wheels, a driven pulley fixed to said drive shaft intermediate the wheels for driving said wheels through said drive shaft, an engine mounted on said deck for rotation about a vertical axis through the crankshaft a cutting blade fixed to the end of said crankshaft and disposed within the housing, said engine having a cam shaft radially spaced from said crankshaft and having its lower end terminating below said deck and above the path of said blade, a driving pulley fixed to said lower end, a vertically disposed idler pulley mounted on said deck between said driven and driving pulley, a belt trained over said driven and driving pulleys and beneath said idler pulley to transmit driving force to said wheels, and actuating means connected to said engine for oscillating said engine about said crankshaft axis to effect movement of said driving pulley, whereby said belt may be tightened or loosened to clutch the pulley with the wheels.

8. The mower of claim 2 wherein each said ground wheel is secured to a plate fixed to said housing and having a plurality of vertically-spaced shaft-receiving openings for mounting the wheel, which openings permit substantially identical vertical adjustment of the housing above the ground at each wheel location.

9. A rotary power mower comprising a housing having a horizontal deck, a plurality of ground wheels attached to said housing for supporting said housing, a handle extending upwardly from said housing for guiding said mower, an engine mounted on said deck for rotation about a vertical axis through the crankshaft of said engine, a cutting blade fixed to the end of said crankshaft and disposed within the housing, said engine having a cam shaft radially spaced from said crankshaft and carrying a pulley, a belt trained about said pulley and adapted to transmit driving power to at least one of said wheels, and an actuating rod having one end connected through a linkage to said engine and the opposite end connected to a sleeve-like grip rotatably mounted on the upper end of said handle for oscillating said engine about said crankshaft axis to effect movement of said pulley, whereby said belt may be tightened or loosened to clutch the pulley with the wheels.

10. The mower of claim 9 wherein said sleeve-like grip has a lever fixed normal thereto providing secondary means for oscillating said engine.

11. Means for clutching a power driven vehicle comprising a housing supported by a plurality of wheels and having an engine mounted thereon for rotation about the axis of the engine crankshaft, said engine having a cam shaft radially spaced from said crankshaft, which comprises a pulley fixed to the end of said cam shaft, a belt trained about said pulley and adapted to transmit driving power to at least one of said wheels, and actuating means connected to said engine for oscillating said engine about said crankshaft axis to effect movement of said pulley, whereby said belt may be tightened or loosened to clutch the pulley with the wheels.

12. The clutching means of claim 11 wherein said actuating means comprises a rod the length of which may be changed by adjusting lock nuts thereon, to compensate for any variation in the length of said belt.

13. The mower of claim 8 in which said wheel carries a nut fixed thereto and adapted to receive a bolt extending through said shaft-receiving opening.

References Cited in the file of this patent

UNITED STATES PATENTS

| | | |
|---|---|---|
| 2,713,917 | Soenksen | July 26, 1955 |
| 2,722,281 | Falkenberg | Nov. 1, 1955 |
| 2,736,389 | Phelps | Feb. 28, 1956 |
| 2,748,553 | Funk | June 5, 1956 |